United States Patent
Tomita et al.

(10) Patent No.: US 6,310,852 B1
(45) Date of Patent: Oct. 30, 2001

(54) OPTICAL RECORDING/REPRODUCING APPARATUS

(75) Inventors: Hironori Tomita, Nara; Hideki Aikoh, Osaka; Hideki Nakata, Kyoto; Hiromichi Furukawa, Miyagi, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/415,290

(22) Filed: Oct. 8, 1999

(30) Foreign Application Priority Data

Oct. 15, 1998 (JP) .................................................. 10-293540

(51) Int. Cl.⁷ ...................................................... G11B 7/00
(52) U.S. Cl. .................................. 369/112.24; 369/44.15
(58) Field of Search ............................. 369/44.14, 44.15, 369/44.16, 44.23, 112.01, 112.23, 112.24, 112.29; 359/813, 814, 823, 824

(56) References Cited

U.S. PATENT DOCUMENTS

| | | | |
|---|---|---|---|
| 5,347,500 | * 9/1994 | Eguchi | 369/44.16 X |
| 5,581,533 | * 12/1996 | Fujisawa | 369/44.15 X |
| 5,822,295 | 10/1998 | Sohmuta . | |
| 5,862,118 | 1/1999 | Takahashi . | |
| 5,898,652 | * 4/1999 | Makigaki et al. | 369/44.16 |

\* cited by examiner

Primary Examiner—Paul W. Huber
(74) Attorney, Agent, or Firm—Merchant & Gould P.C.

(57) ABSTRACT

An optical recording/reproducing apparatus comprises: a light receiving and emitting device that emits divergent optical beams and detects various signals on a disk; a collimator lens for converting the optical beams emitted from the device into parallel beams; an objective lens for converging the optical beams of the parallel beams onto the disk; and an objective-lens drive for driving the objective lens in a focusing direction perpendicular to a recording surface of the disk and in a radial direction parallel to the recording surface. The objective-lens drive is supported by suspensions attached at one end to a lens holder for holding the objective lens and to a fixing member at their other ends. The collimator lens is positioned between the objective lens and the fixing member. Thus, the optical recording/reproducing apparatus can be reduced in size and can improve the strength of the suspensions for supporting the objective-lens drive against disturbance vibration or impact caused when the optical recording/reproducing apparatus is dropped.

8 Claims, 8 Drawing Sheets

OPTICAL RECORDING/REPRODUCING APPARATUS

FIELD OF THE INVENTION

The present invention relates to an optical recording/reproducing apparatus that optically writes information on or optically readouts information from a recording medium.

BACKGROUND OF THE INVENTION

This kind of optical recording/reproducing apparatus optically writes information on or optically readouts information from an optical disk such as MD (a mini disc), a magneto-optical disk, or the like while driving an objective lens in two axial directions, namely an optical axial direction (a focusing direction) perpendicular to a recording surface of the optical disk and a radial direction parallel to the recording surface, to compensate shifts in focusing due to wobbling of the optical disk or in tracking due to deviation or the like of the optical disk.

Recently, in an optical recording/reproducing apparatus provided with an objective-lens actuator for driving an objective lens in a focusing direction and in a radial direction via a plurality of elastic members arranged almost in parallel to one another, a configuration in which a fixing member for attaching the elastic members is positioned between the objective lens and a light source to reduce the size of the whole apparatus mainly has been employed.

An example of the above-mentioned conventional optical recording/reproducing apparatus will be described with reference to the drawings as follows.

Figure 6:
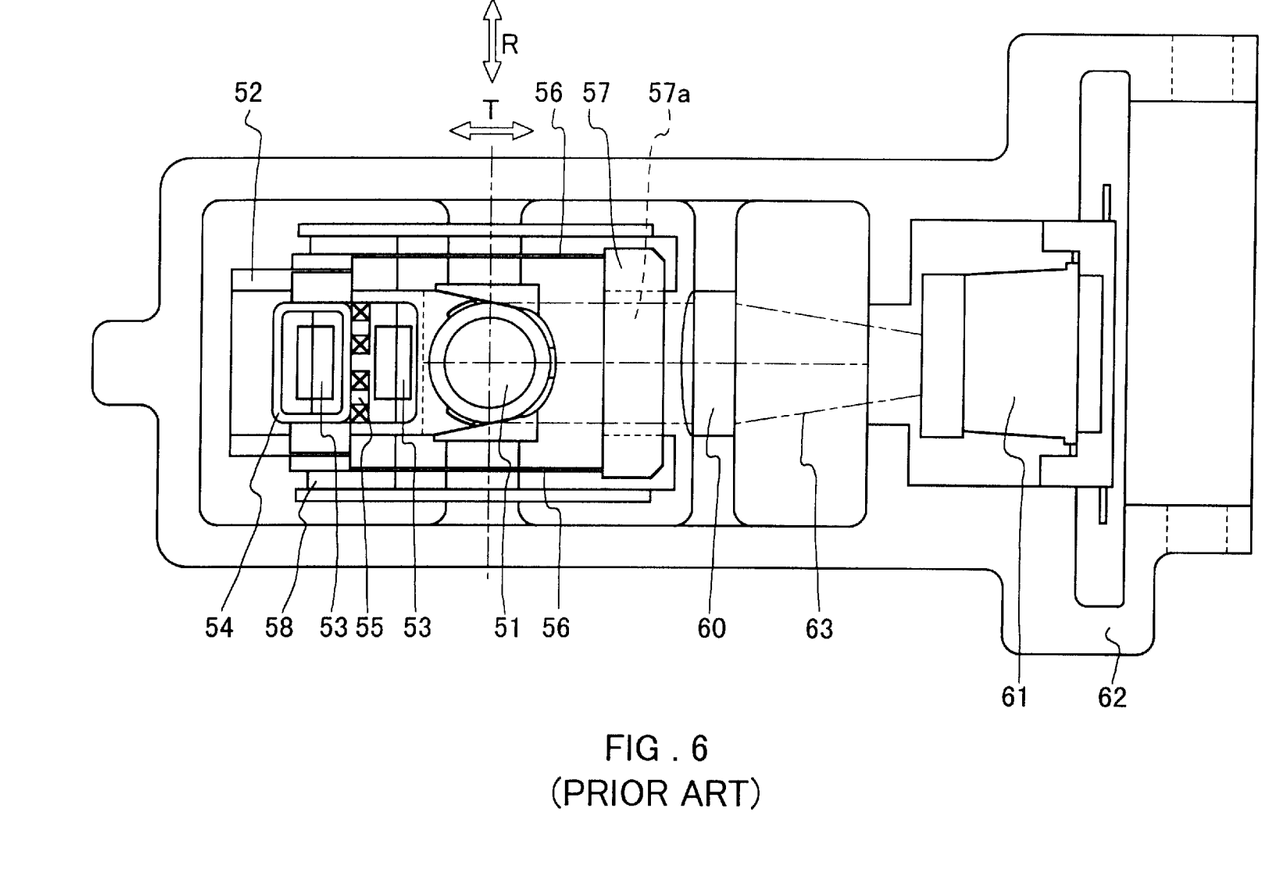
FIG. 6 is a plan view showing a conventional optical recording/reproducing apparatus.
Figure 7:
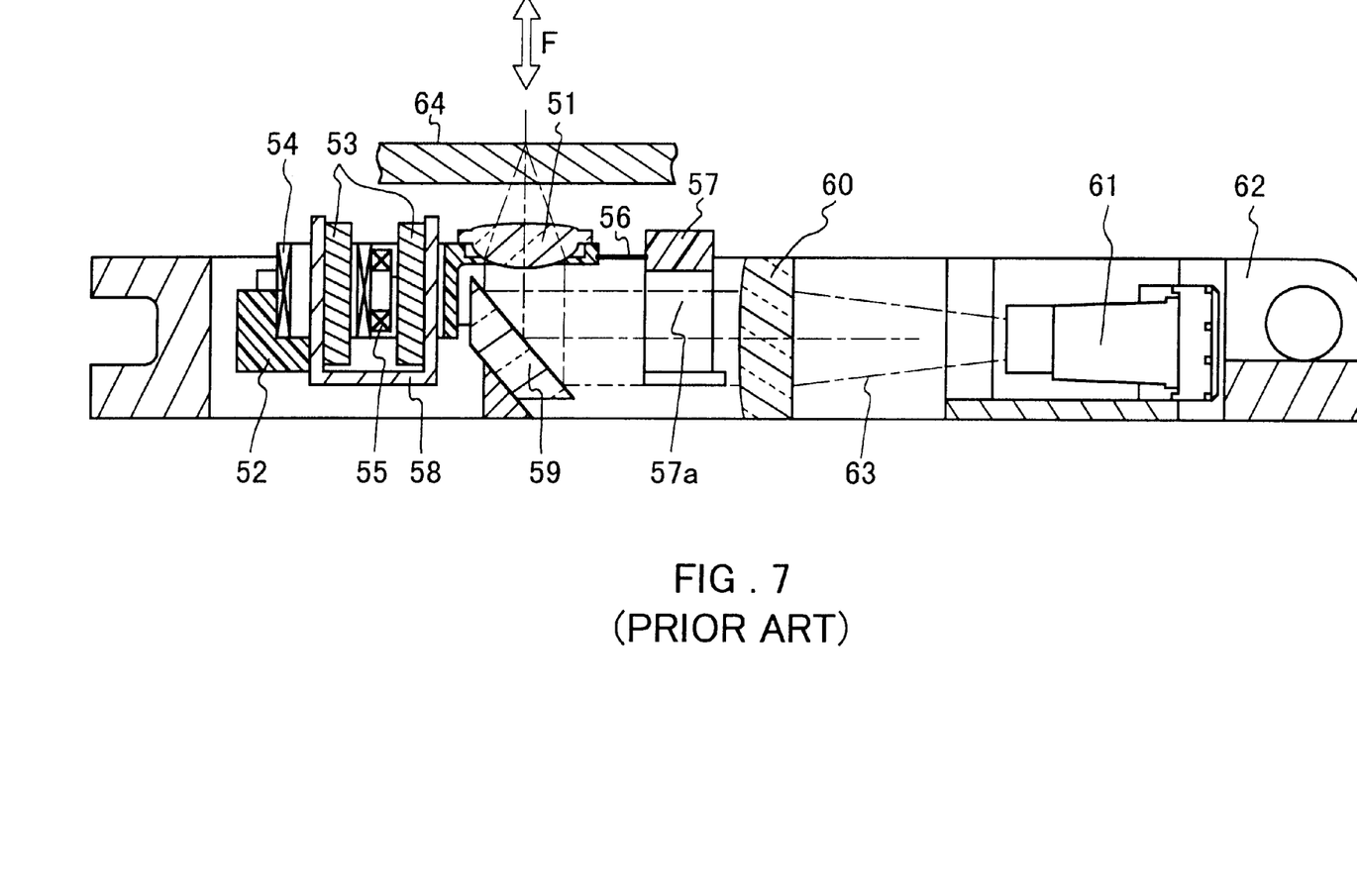
FIG. 7 is a sectional side view showing the conventional optical recording/reproducing apparatus.

FIG. 6 is a plan view showing a conventional optical recording/reproducing apparatus. FIG. 7 is a sectional side view showing the conventional optical recording/reproducing apparatus.

As shown in FIGS. 6 and 7, the conventional optical recording/reproducing apparatus comprises: a light receiving and emitting device 61 including a light source for emitting divergent optical beams 63, a focusing-error-signal detector, a tracking-error-signal detector, and an information-signal detector; a collimator lens 60 for converting the divergent optical beams 63 emitted from the light source in the device 61 into parallel beams; a mirror 59 for orthogonally refracting the optical beams 63 converted to the parallel beams by the collimator lens 60; an objective lens 51 for converging the orthogonally refracted optical beams 63 onto a disk 64; an objective-lens actuator for driving the objective lens 51 in a focusing direction F and in a radial direction R of the disk 64; and an optical block 62 for fixing the device 61, the mirror 59, and the objective-lens actuator. A movable part comprising a lens holder 52 for holding the objective-lens 51, a focusing coil 54, and a pair of tracking coils 55 in the objective-lens actuator is attached to a fixing member 57 via four suspensions 56 of elastic members that are arranged in parallel to one another and that are formed of stainless steel, phosphor bronze, beryllium copper, or the like. The fixing member 57 is fixed to a base 58 that is further fixed to the optical block 62. In this case, the fixing member 57 is provided with an opening portion 57a for avoiding the interference with the optical beams 63. The fixing member 57 is positioned between the objective lens 51 and the device 61 with respect to a tangential direction T (the direction perpendicular to the focusing direction F and the radial direction R), thus reducing the size of the optical recording/reproducing apparatus in the tangential direction T. A magnetic circuit is formed of the base 58 and a pair of magnets 53, and the focusing coil 54 and the tracking coil 55 are positioned in a space within the magnetic circuit. Thus, a magnetic field is applied to the focusing coil 54 and the tracking coil 55.

The operation of the optical recording/reproducing apparatus formed as described above will be described as follows.

The divergent optical beams 63 emitted from the light source in the device 61 are converted into parallel beams by the collimator lens 60. The parallel beams are reflected by the mirror 59 and enter into the objective lens 51, thus being converged on the disk 64. Light reflected from the disk 64 is converged in the signal detectors on the device 61 through the reverse path, thus detecting signals. In this case, the objective lens 51 is driven by the focusing coil 54 and the tracking coil 55 in the focusing direction F and in the radial direction R respectively so as to follow wobbling or deviation of the disk 64.

In further reducing the size of the optical recording/reproducing apparatus having such a configuration as mentioned above, there are two problems of the interference between the optical beams 63 (parallel beams) that came out from the collimator lens 60 and the fixing member 57 by which the objective-lens actuator is fixed with respect to the radial direction R and the interference between the collimator lens 60 and the fixing member 57 with respect to the tangential direction T.

With the reduction in size of the optical recording/reproducing apparatus, the length of the suspensions 56 for supporting the movable part also is shortened and sufficient strength against disturbance vibration or impact caused when the optical recording/reproducing apparatus is dropped cannot be obtained. Thus, there is a fear of causing deformation or breakage of the suspensions 56.

SUMMARY OF THE INVENTION

It is an object of the present invention to solve the above-mentioned conventional problems and provide an optical recording/reproducing apparatus that can be further reduced in size and can improve the strength of suspensions of elastic members for supporting a movable part against disturbance vibration or impact caused when the optical recording/reproducing apparatus is dropped.

In order to attain the above-mentioned object, a recording/reproducing apparatus of the present invention comprises: a light source for emitting divergent optical beams; a collimator lens for converting the optical beams emitted from the light source into parallel beams; an objective lens for converging the optical beams converted to the parallel beams by the collimator lens onto a recording medium; an objective-lens actuator having a mechanism for driving the objective lens in an optical axial direction perpendicular to a recording surface of the recording medium and in a radial direction parallel to the recording surface; and a signal detector for detecting various signals on the recording medium. The optical recording/reproducing apparatus of the present invention is characterized in that the objective-lens actuator is supported by elastic members that are attached to a lens holder for holding the objective lens at their one ends and to a fixing member at their other ends to enable the lens holder to move in the optical axial direction and in the radial direction, and the collimator lens is positioned between the objective lens and the fixing member with respect to the direction perpendicular to the optical axial direction and the radial direction. According to the configuration of this optical recording/reproducing apparatus, the distance from the center of the objective lens to an end face of the collimator lens can be shortened compared to that in the conventional optical recording/reproducing apparatus. Further, since the fixing member is positioned in divergent beams between the light source and the collimator lens, an opening portion provided in the fixing member to avoid interference with the optical beams can be reduced in size compared to that in the conventional optical recording/reproducing apparatus. Therefore, the optical recording/reproducing apparatus can be further reduced in size with respect to the direction perpendicular to the optical axial direction and the radial direction. In addition, the optical recording/reproducing apparatus also can be reduced in size with respect to the radial direction. Furthermore, the length of the elastic members for attaching a movable part of the objective-lens actuator to the fixing member can be lengthened compared to that in the conventional optical recording/reproducing apparatus. As a result, when elastic members with desired spring constant are used, their sectional forms can be enlarged. Therefore, the absolute strength of the elastic members increases, thus obtaining advantages for avoiding disturbance vibration or impact caused when the optical recording/reproducing apparatus is dropped.

In the configuration of the optical recording/reproducing apparatus according to the present invention, it is preferable that the light source and the signal detector are combined to form one component. According to this preferable example, the number of components can be reduced, thus contributing to the reduction in size of the apparatus.

Further, in the configuration of the optical recording/reproducing apparatus according to the present invention, it is preferable that the light source, the signal detector, and the collimator lens are fixed to a base.

In the configuration of the optical recording/reproducing apparatus according to the present invention, it is preferable that the signal detector and the objective lens are optically adjusted with respect to each other by shifting of the objective-lens actuator within a plane parallel to the recording surface of the recording medium. According to this preferable example, since the adjustment of the signal detector is not required in the optical axial direction of the objective lens, the whole apparatus can be reduced in thickness. Further, in this case, it is preferable that the light source and the signal detector are combined to form one component.

In the configuration of the optical recording/reproducing apparatus according to the present invention, it is preferable that the light source is attached to the fixing member. According to this preferable example, since the relative displacement between the objective lens and the light source, for example when the temperature varies, is reduced, the reliability of the apparatus is improved. In addition, the length of the elastic members for attaching the movable part of the objective-lens actuator to the fixing member can be lengthened to the vicinity of the light source. As a result, when elastic members with desired spring constant are used, their sectional forms can be further enlarged. Therefore, the absolute strength of the elastic members further increases, thus obtaining advantages for avoiding disturbance vibration or impact caused when the optical recording/reproducing apparatus is dropped.

In the configuration of the optical recording/reproducing apparatus according to the present invention, it is preferable that the signal detector is attached to the fixing member. According to this preferable example, since the relative displacement between the objective lens and the signal detector, for example when the temperature varies, is reduced, the reliability of the apparatus is improved.

Moreover, in the configuration of the optical recording/reproducing apparatus according to the present invention, it is preferable that the collimator lens is attached to the fixing member. According to this preferable example, since the relative displacement between the objective lens and the collimator lens, for example when the temperature varies, is reduced, the reliability of the apparatus is improved.

DETAILED DESCRIPTION OF THE INVENTION

The present invention will be described further in detail using embodiments as follows.

First Embodiment

An optical recording/reproducing apparatus of a first embodiment of the present invention will be described with reference to FIGS. 1 and 2.

Figure 1:
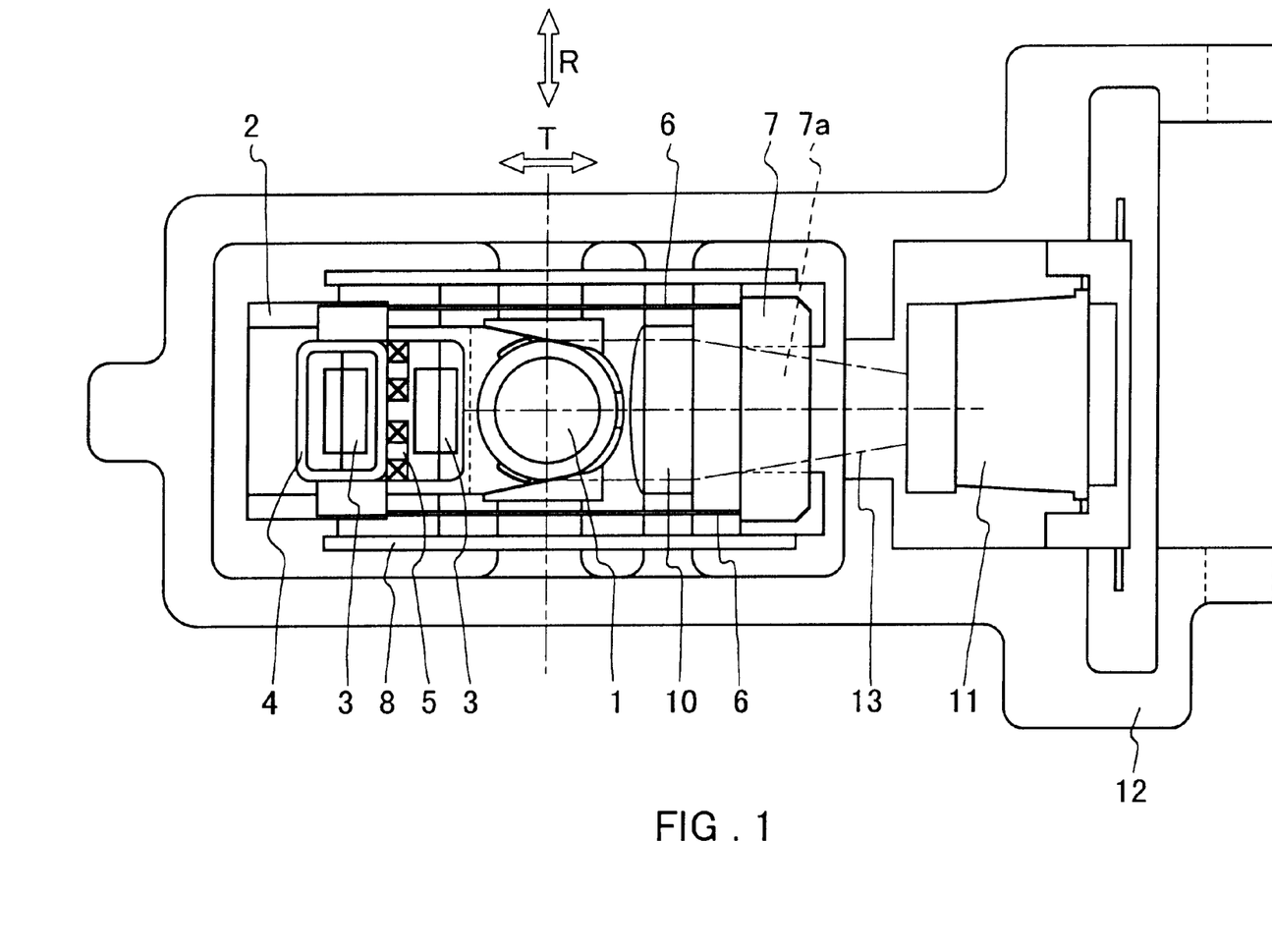
FIG. 1 is a plan view showing an optical recording/reproducing apparatus of a first embodiment of the present invention.

FIG. 1 is a plan view showing an optical recording/reproducing apparatus of the first embodiment of the present invention. FIG. 2 is a sectional side view showing the optical recording/reproducing apparatus of the first embodiment of the present invention.

Figure 2:
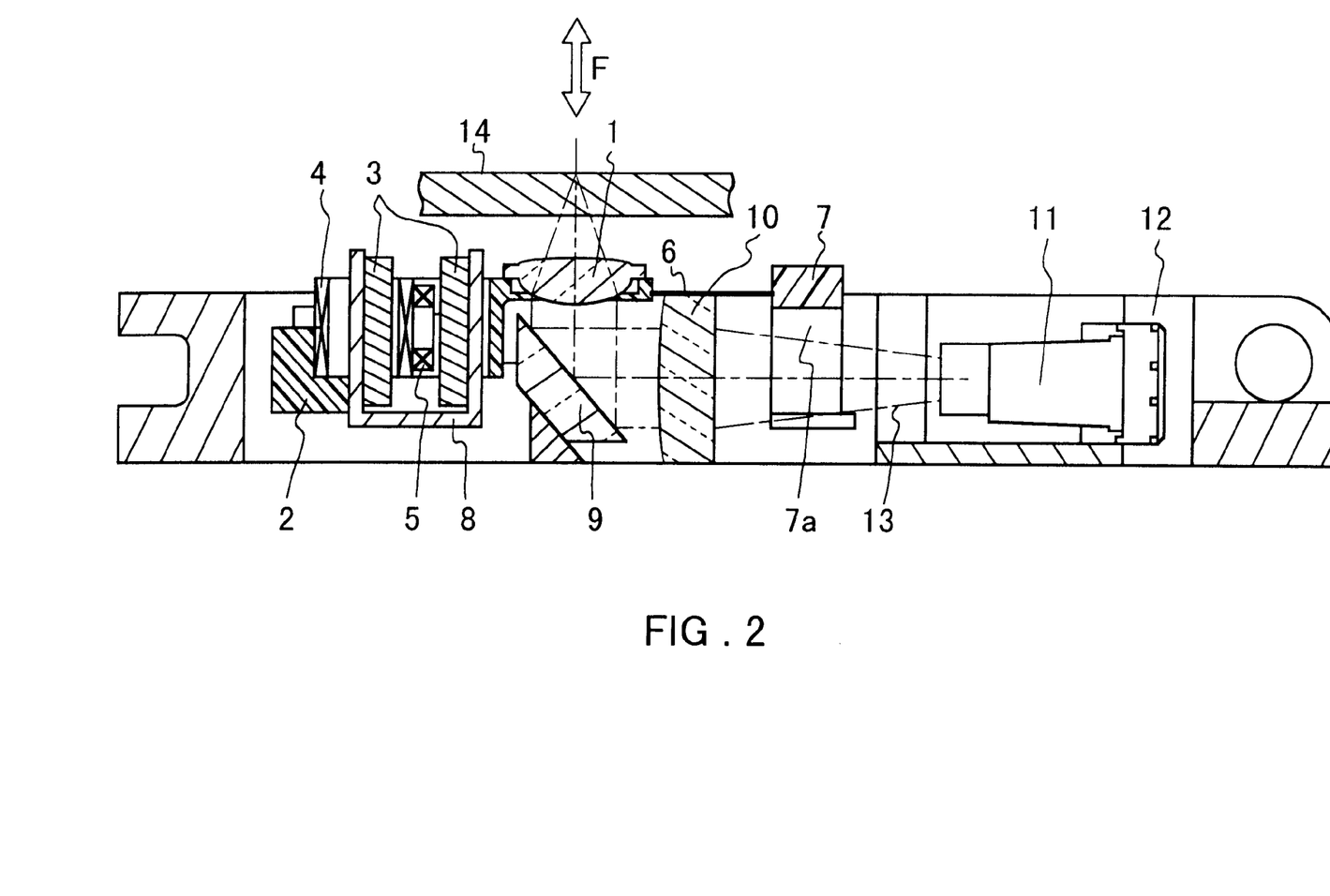
FIG. 2 is a sectional side view showing the optical recording/reproducing apparatus of the first embodiment of the present invention.

As shown in FIGS. 1 and 2, the optical recording/reproducing apparatus of the present embodiment comprises: a light receiving and emitting device 11 including a light source for emitting divergent optical beams 13, a focusing-error-signal detector, a tracking-error-signal detector, and an information-signal detector; a collimator lens 10 for converting the divergent optical beams 13 emitted from the light source in the device 11 into parallel beams; a mirror 9 for orthogonally refracting the optical beams 13 converted to the parallel beams by the collimator lens 10; an objective lens 1 for converging the orthogonally refracted optical beams 13 onto a disk 14; an objective-lens actuator for driving the objective lens 1 in a focusing direction F and in a radial direction R of the disk 14; and an optical block 12 for fixing the device 11, the mirror 9, and the objective-lens actuator. A movable part comprising a lens holder 2 for holding the objective lens 1, a focusing coil 4, and a pair of tracking coils 5 in the objective-lens actuator is attached to a fixing member 7 via four suspensions 6 of elastic members that are arranged in parallel to one another and that are formed of stainless steel, phosphor bronze, beryllium copper, or the like. The fixing member 7 is fixed to a base 8 that is further fixed to the optical block 12. In this case, the fixing member 7 is provided with an opening portion 7a for avoiding the interference with the optical beams 13. A magnetic circuit is formed of the base 8 and a pair of magnets 3, and the focusing coil 4 and the tracking coil 5 are positioned in a space within the magnetic circuit. Thus, a magnetic field is applied to the focusing coil 4 and the tracking coil 5. The collimator lens 10 and the device (the light source and the signal detectors) 11 are fixed to the optical block 12.

The collimator lens 10 is positioned between the objective lens 1 and the fixing member 7 with respect to a tangential direction T (the direction perpendicular to the focusing direction F and the radial direction R).

Next, the operation of the optical recording/reproducing apparatus formed as mentioned above will be described.

The divergent optical beams 13 emitted from the light source in the device 11 are converted into parallel beams by the collimator lens 10. The parallel beams are reflected by the mirror 9 and enter into the objective lens 1, thus being converged on the disk 14. Light reflected from the disk 14 is converged in the signal detectors on the device 11 through the reverse path, thus detecting signals. In this case, the objective lens 1 is driven by the focusing coil 4 and the tracking coil 5 in the focusing direction F and in the radial direction R respectively so as to follow wobbling or deviation of the disk 14.

Effects obtained by the optical recording/reproducing apparatus of the first embodiment of the present invention will be described as follows.

Figure 3:
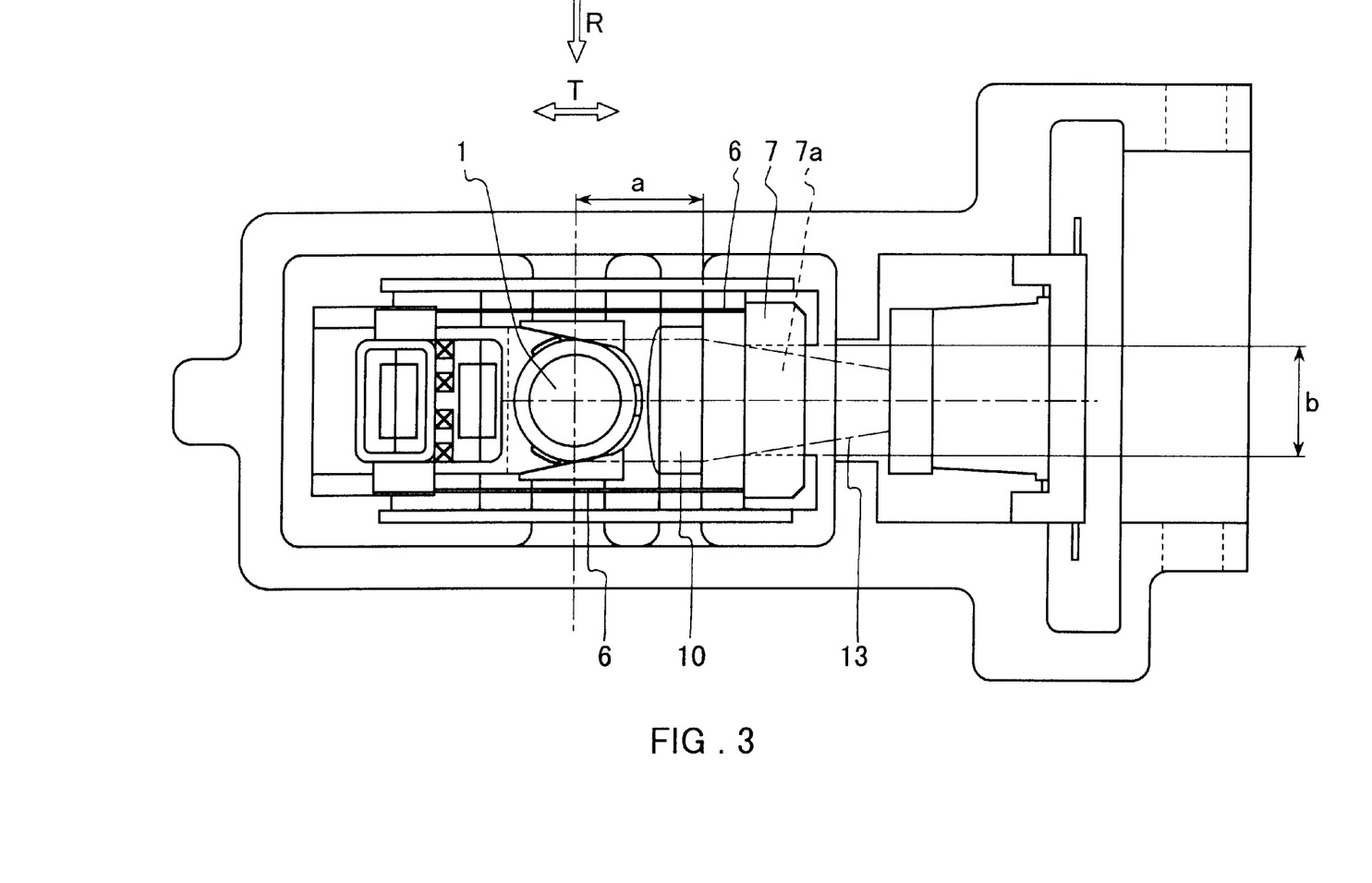
FIG. 3 is a plan view showing the size relationship in the optical recording/reproducing apparatus of the first embodiment of the present invention.
Figure 8:
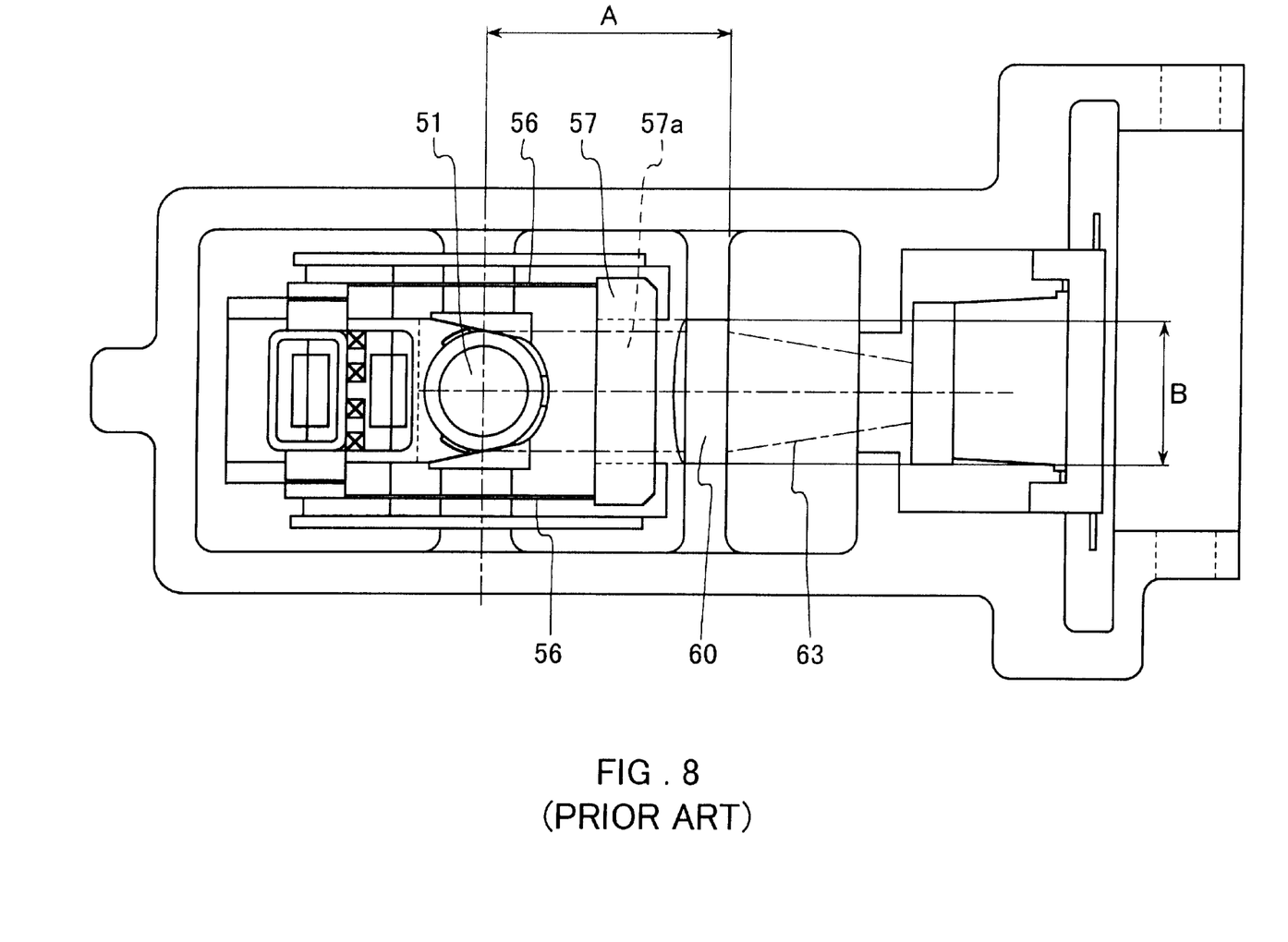
FIG. 8 is a plan view showing the size relationship in the conventional optical recording/reproducing apparatus.

FIG. 3 is a plan view showing the size relationship in the optical recording/reproducing apparatus of the first embodiment of the present invention. FIG. 8 is a plan view showing the size relationship in a conventional optical recording/reproducing apparatus.

In the present embodiment, the collimator lens 10 is positioned between the objective lens 1 and the fixing member 7 with respect to the tangential direction T. Therefore, as shown in FIG. 3, the distance a from the center of the objective lens 1 to an end face of the collimator lens 10 can be shortened compared to the distance A from the center of an objective lens 51 to an end face of a collimator lens 60 in the conventional optical recording/reproducing apparatus shown in FIG. 8. In addition, as shown in FIG. 3, the fixing member 7 is positioned in divergent beams between the collimator lens 10 and the device 11. Therefore, the size b of the opening portion 7a provided in the fixing member 7 in order to avoid the interference with the optical beams 13 can be reduced compared to the size B of an opening portion 57a in the case of the conventional optical recording/reproducing apparatus shown in FIG. 8 (in the case where the fixing member 7 is positioned in parallel beams between the collimator lens 10 and the objective lens 1). Therefore, according to the present embodiment, the optical recording/reproducing apparatus can be further reduced in size in the tangential direction T. In addition, the optical recording/reproducing apparatus also can be reduced in size in the radial direction R.

Moreover, according to the present embodiment, since the collimator lens 10 is positioned between the objective lens 1 and the fixing member 7, the length of the suspensions 6 for attaching the movable part of the objective-lens actuator to the fixing member 7 can be lengthened compared to that of suspensions 56 in the case of the conventional optical recording/reproducing apparatus shown in FIGS. 6 and 7 (in the case where the fixing member 57 is positioned between an objective lens 51 and a collimator lens 60). As a result, when suspensions with desired spring constant are used, their sectional forms can be enlarged. Therefore, the absolute strength of the suspensions increases, thus obtaining advantages for avoiding disturbance vibration or impact caused when the optical recording/reproducing apparatus is dropped.

Further, in the present embodiment, the fixing member 7 for holding the movable part via the suspensions 6 is fixed to the optical block 12 via the base 8. However, the fixing member 7 may be fixed to the optical block 12 via an adjustment mechanism (not shown in the figure). In this case, when the signal detectors in the device 11 and the objective lens 1 are optically adjusted with respect to each other by shifting of the objective-lens actuator within a plane parallel to a recording surface of the disk 14, the device (the light source and the signal detectors) 11 is not required to be adjusted in an optical axis direction (the focusing direction F) of the objective lens 1. Thus, the whole apparatus can be reduced in thickness.

Second Embodiment

An optical recording/reproducing apparatus of a second embodiment of the present invention will be described with reference to FIGS. 4 and 5 as follows.

Figure 4:
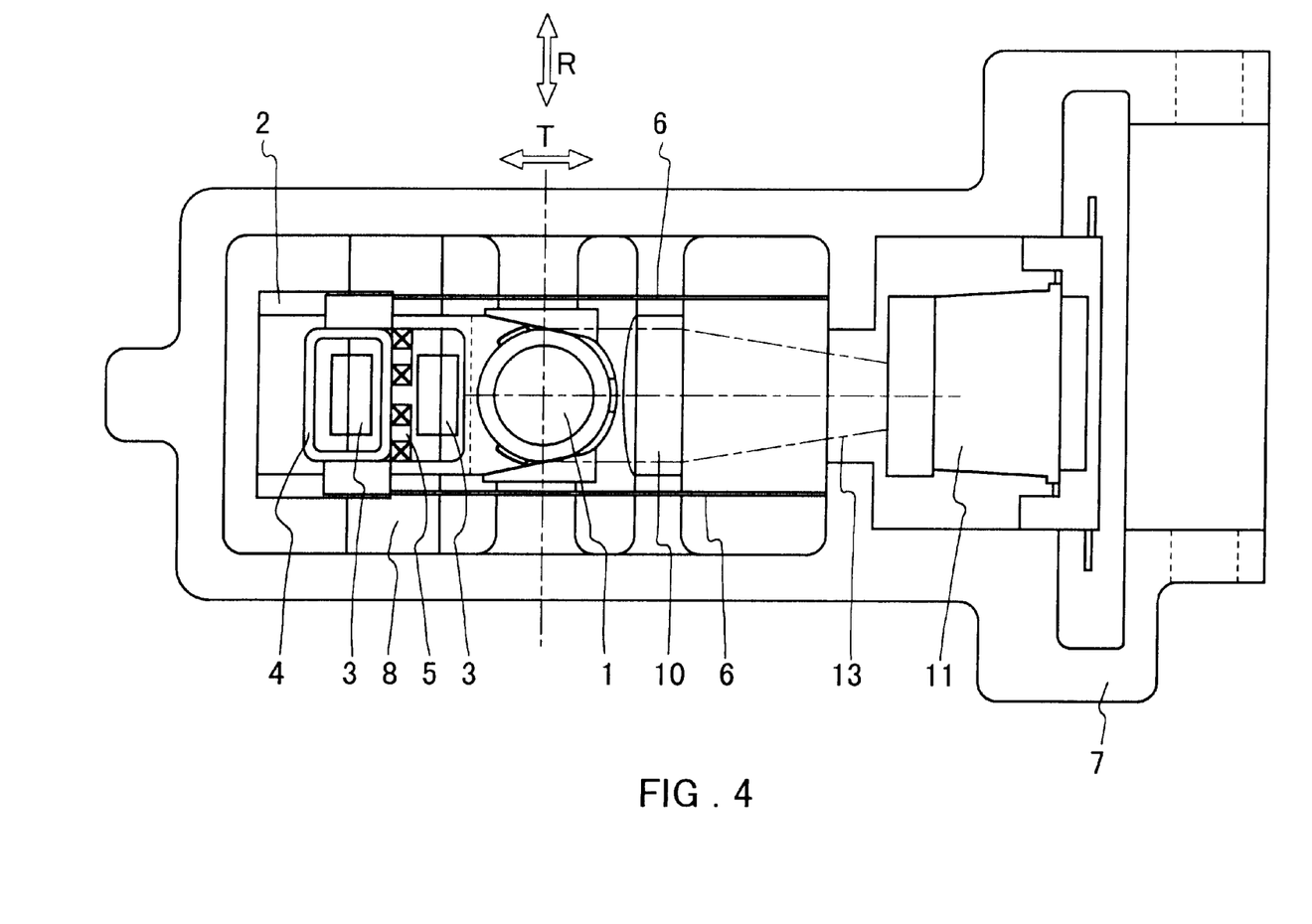
FIG. 4 is a plan view showing an optical recording/reproducing apparatus of a second embodiment of the present invention.

FIG. 4 is a plan view showing an optical recording/reproducing apparatus of the second embodiment of the present invention. FIG. 5 is a sectional side view showing the optical recording/reproducing apparatus of the second embodiment of the present invention.

Figure 5:
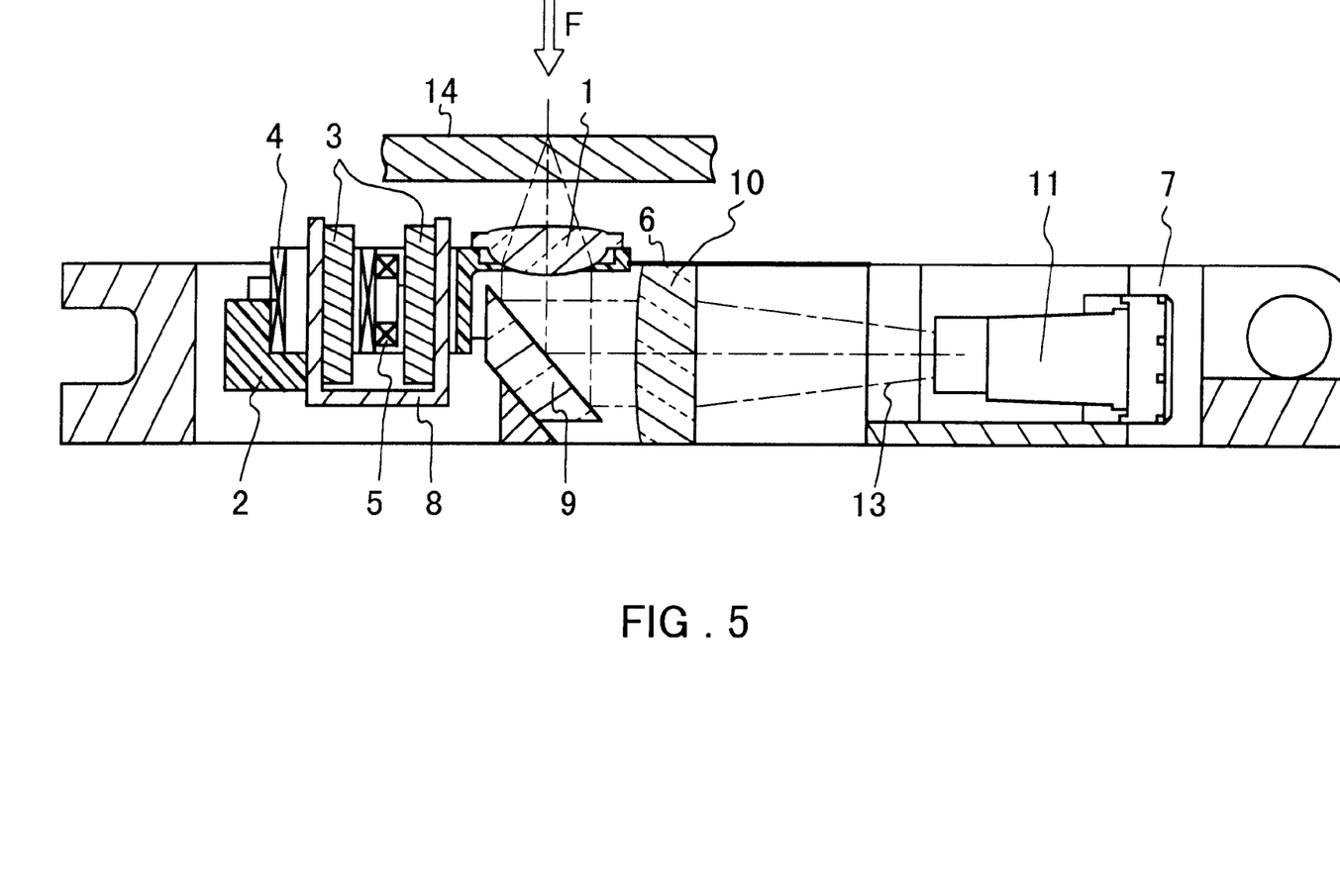
FIG. 5 is a sectional side view showing the optical recording/reproducing apparatus of the second embodiment of the present invention.

As shown in FIGS. 4 and 5, a fixing member 7 is combined with an optical block (see a reference number 12 in FIGS. 1 and 2) to form one component. To the fixing member 7, a collimator lens 10 and a light receiving and emitting device (a light source and signal detectors) 11 are attached directly. The other configuration is the same as that of the abovementioned first embodiment. Therefore, the same members as those in the first embodiment are indicated with the same reference characters and descriptions thereof are omitted here.

Through direct attachment of the collimator lens 10 and the device 11 to the fixing member 7, the relative displacement between the objective lens 1 (attached to the fixing member 7 via suspensions 6) and the collimator lens 10/the device 11, for example when the temperature varies, is reduced compared to the case in the above-mentioned first embodiment (the case where the collimator lens 10 and the device 11 are fixed to the optical block 12). Consequently, the reliability of the optical recording/reproducing apparatus increases.

Since the fixing member 7 and the optical block are combined to form one component, the number of components can be reduced. Further, in this case, the length of the suspensions 6 for attaching a movable part of an objective-lens actuator to the fixing member 7 can be lengthened to the vicinity of the device 11. As a result, when suspensions with desired spring constant are used, their sectional forms can be further enlarged compared to those in the above-mentioned first embodiment. Therefore, the absolute strength of the suspensions increases, thus obtaining advantages for avoiding disturbance vibration or impact caused when the optical recording/reproducing apparatus is dropped.

In the above-mentioned embodiments, the light source for emitting divergent optical beams 13 and the detectors (a focusing-error-signal detector, a tracking-error-signal detector, and an information-signal detector) for detecting various signals on the disk 14 were combined to form one component as the light receiving and emitting device 11.

However, it is not always necessary to combine them into one component. The light source for emitting the divergent optical beams 13 and the detectors for detecting various signals on the disk 14 may be provided independently.

As described above, according to the present invention, since the collimator lens is positioned between the objective lens and the fixing member with respect to the tangential direction, the optical recording/reproducing apparatus can be reduced in size. In addition, the length of the elastic members for attaching the movable part of the objective-lens actuator to the fixing member can be lengthened compared to that in a conventional optical recording/reproducing apparatus. As a result, when elastic members with desired spring constant are used, their sectional forms can be enlarged. Therefore, the absolute strength of the elastic members increases, thus obtaining advantages for avoiding disturbance vibration or impact caused when the optical recording/reproducing apparatus is dropped.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An optical recording/reproducing apparatus comprising:

a light source for emitting divergent optical beams;

a collimator lens for converting the optical beams emitted from the light source into parallel beams;

an objective lens for converging the optical beams converted to the parallel beams by the collimator lens onto a recording medium;

an objective-lens actuator having a mechanism for driving the objective lens in an optical axial direction perpendicular to a recording surface of the recording medium and in a radial direction parallel to the recording surface; and a signal detector for detecting various signals reproduced from the recording medium, wherein elastic members are attached at one end to a lens holder for holding the objective lens and to a fixing member at their other ends to enable the lens holder to move in the optical axial direction and in the radial direction, and the collimator lens is positioned between the objective lens and the fixing member with respect to a direction perpendicular to the optical axial direction and the radial direction.

2. The optical recording/reproducing apparatus according to claim 1, wherein the light source and the signal detector are combined to form one component.

3. The optical recording/reproducing apparatus according to claim 1, wherein the light source, the signal detector, and the collimator lens are fixed to an optical block.

4. The optical recording/reproducing apparatus according to claim 1, wherein the signal detector and the objective lens are optically adjusted with respect to each other by shifting of the objective-lens actuator within a plane parallel to the recording surface of the recording medium.

5. The optical recording/reproducing apparatus according to claim 4, wherein the light source and the signal detector are combined to form one component.

6. The optical recording/reproducing apparatus according to claim 1, wherein the light source is attached to the fixing member.

7. The optical recording/reproducing apparatus according to claim 1, wherein the signal detector is attached to the fixing member.

8. The optical recording/reproducing apparatus according to claim 1, wherein the collimator lens is attached to the fixing member.

* * * * *